Patented Apr. 20, 1926.

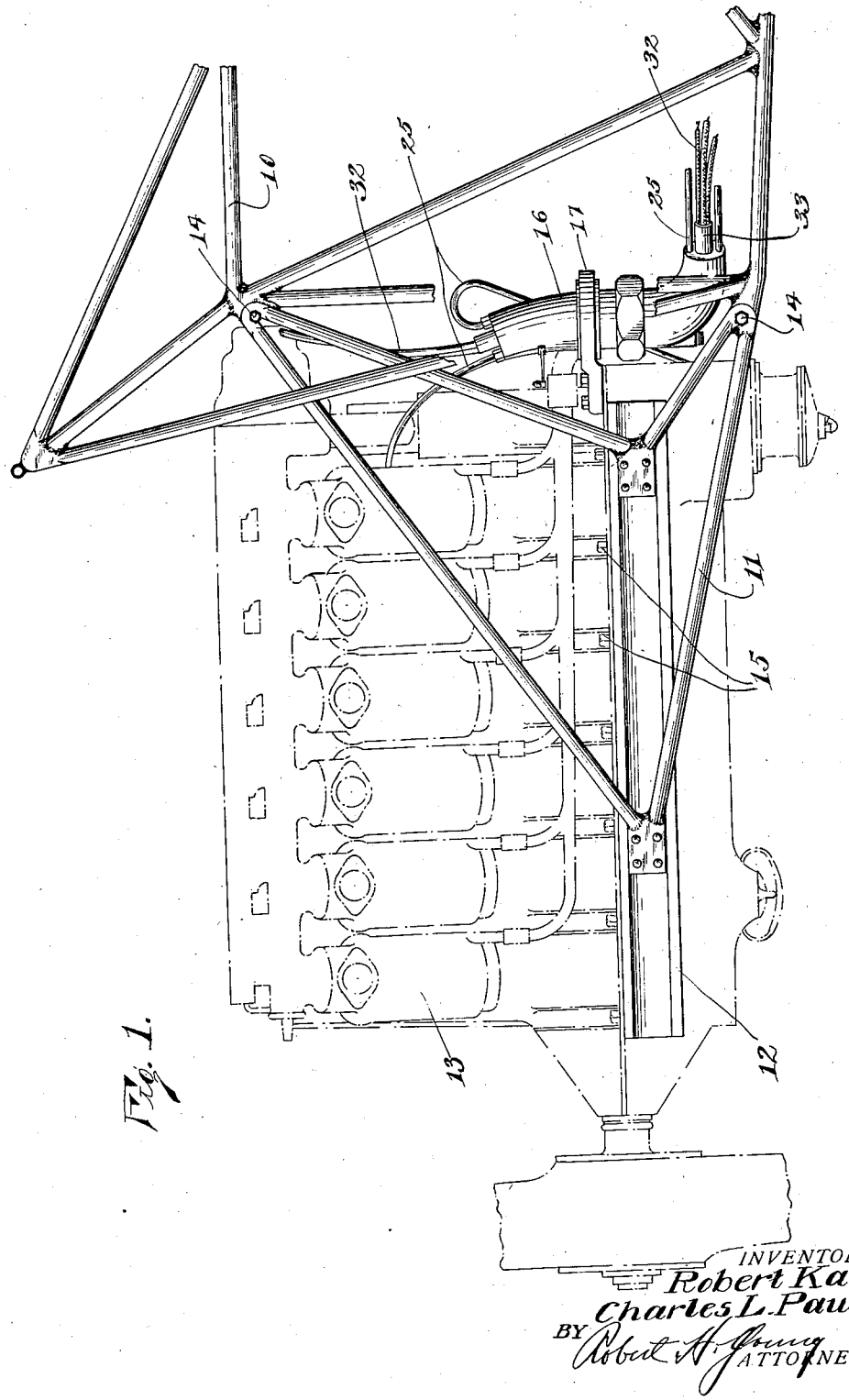

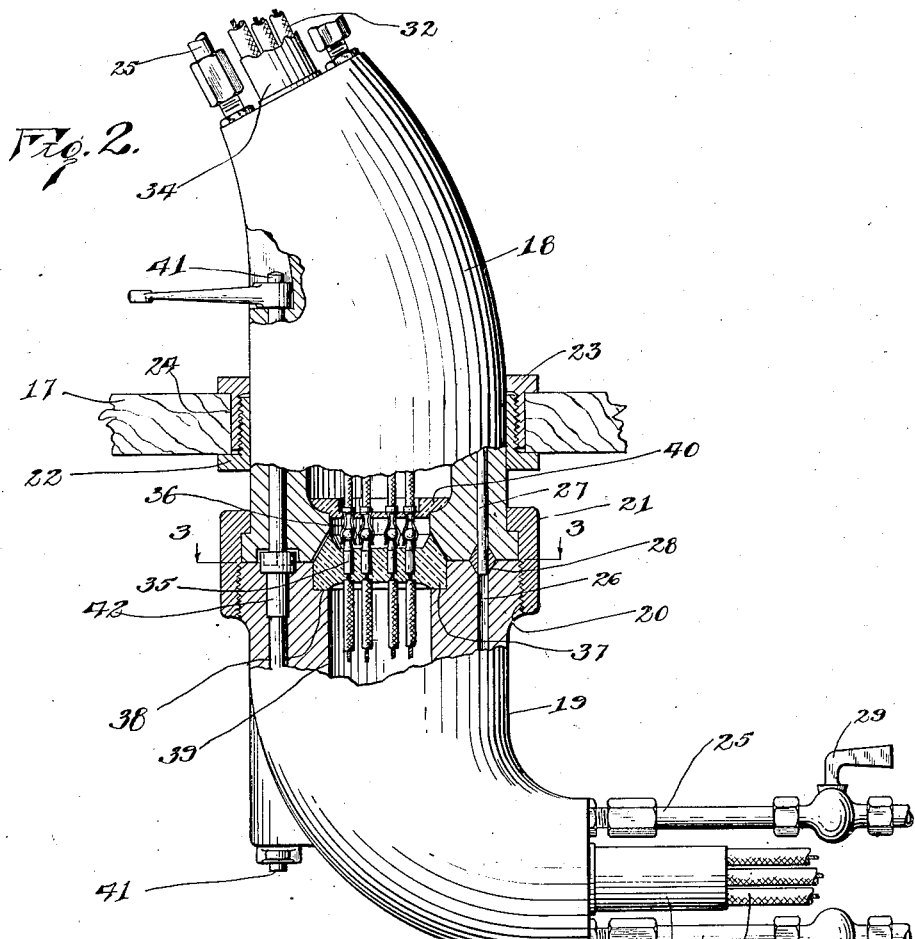
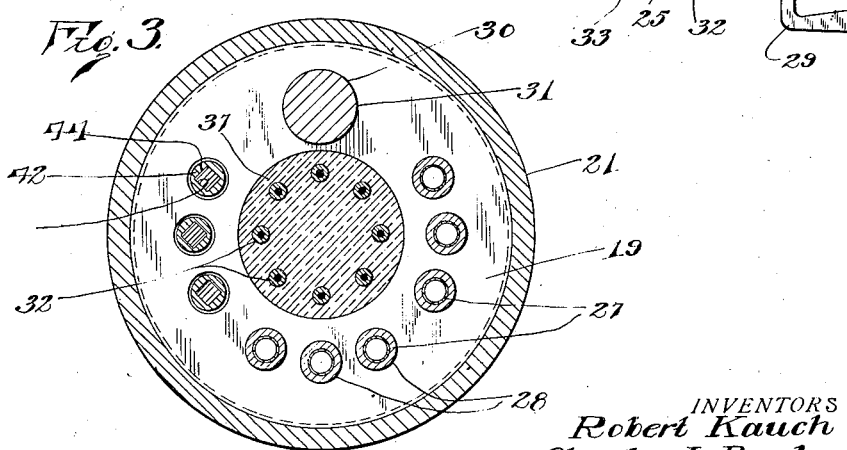

1,581,539

UNITED STATES PATENT OFFICE.

ROBERT KAUCH AND CHARLES L. PAULUS, OF DAYTON, OHIO.

QUICKLY-DETACHABLE CONNECTION FOR THE POWER PLANT OR POWER-PLANT UNIT OF AN AIRPLANE.

Application filed October 9, 1923. Serial No. 667,557.

*To all whom it may concern:*

Be it known that we, ROBERT KAUCH and CHARLES LEIGH PAULUS, both citizens of the United States, residing at Dayton, in the county of Montgomery and State of Ohio, have invented certain new and useful Improvements in a Quickly-Detachable Connection for the Power Plant or Power-Plant Unit of an Airplane, of which the following is a specification.

This invention relates to a quickly detachable connection for the power plant or power plant unit of an airplane.

Airplane engines in constant service require frequent repair or replacement and it has been a matter of great difficulty and time-consuming work to disconnect and connect again all of the many feed lines such as for oil, gasoline, water and air, and all electrical connections and the throttle control, tachometer drive, etc. For the purpose of facilitating the removal of the power plant or power plant unit, it is herein proposed to have all of the many connections referred to pass through a single terminal union which can be readily connected or disconnected so that the matter of undoing all of the connections involves merely loosening a single union nut to secure the disconnection of all of the connections in a single operation, the matter of again completing the said connections being similarly facilitated.

Referring to the drawings in which we have illustrated the invention as applied to a single-motored airplane of a conventional form, Fig. 1 is a side elevation of the forward end of the airplane fuselage showing a power plant unit detachably mounted thereon and utilizing a terminal union in accordance with our invention. Fig. 2 is a view partly in section and partly in elevation of the terminal union shown on an enlarged scale. Fig. 3 is a horizontal cross section on a still more enlarged scale taken on the line 3—3 of Fig. 2 looking in the direction of the arrows.

Before proceeding with a detailed description of the invention, it having been stated that the same is illustrated as applied to an airplane, it will be well to point out that the invention is capable of use in various other connections, for example, as a means of enabling quickly detaching the motor of an automobile, tractor, motor boat, or the like. Furthermore, although the invention is illustrated as applied to a single-motored airplane where the entire power plant unit is replaced when it becomes necessary or desirable to repair or replace the motor, it is also intended for use with other types of planes, as, for example, in connection with a complete nacelle in a multi-motored airplane.

The airplane, a portion of which is shown in Fig. 1, has attached to the longérons 10 of the fuselage a front section 11 having side channels 12 for supporting the motor 13. The front frame section 11, together with the motor 13, constitutes the power plant unit and is supported from bolts 14 by the fuselage, it being intended that the power plant unit may be removed as a whole when the bolts 14 are withdrawn. In certain cases the supporting frame 11 is built up as a permanent part of the fuselage and the motor designed to be removed therefrom separately when cap screws 15, securing the motor to the channels 12, are unscrewed. It has been the practice heretofore, upon the frequent repair or replacement of the motor, to have to disconnect all of the many feed lines, control lines, and other connections for the motor extending from the cockpit or from other points in the fuselage. We have provided a terminal union 16 which is supported by a bracket 17 from the motor 13 when the terminal union is assembled. With this union there is avoided the necessity of disconnecting all of the aforesaid connections and again completing such connections, since all of them are passed through the union 16 and are opened or closed in one operation when the union is taken apart or put together.

The union 16 is a two-piece one comprising a section 18 staying with the motor and a section 19 staying with the airplane fuselage, the section 19 being threaded as at 20 to receive a union nut 21 which is of the gland type for drawing the two sections together. Section 18 is suitably clamped in a bushing 22 when the gland nut 23 threaded therein is tightened, the gland nut and bushing together being received in an opening 24 provided in the bracket 17. The sections of the union may be made of any suitable material permitting the connection thereon of feed lines 25 for oil, gasoline, water, and air. These lines communicate with ducts 26 in the lower section 19 of the union. Connection with the lines 25 tapped into the upper section 18 of the union is afforded through tubes 27 extending through the section 18 into the ducts 26 and suitably sealed at the joint by olive connections 28. The feed lines may be shut off by cocks 29 interposed in the flexible tubing of which the lines are made, or entered in one of the sections intersecting the proper passages therethru. It is apparent that when the union is disconnected by loosening the nut 21, all of the feed lines to the motor are disconnected in a single operation. When the connection is again established, the proper feed lines are again associated in a single operation by tightening the nut 21. To avoid any possibility of the feed lines not being properly associated, a dowel pin 30 is provided on the section 18 to enter a location hole 31 in the section 19. It will be appreciated that the union will greatly facilitate the operation of detaching a motor in the event the same has to be removed for repairs. In case the motor is replaced by another motor, it will of course be necessary to provide the connections on such motor with a terminal union section 18 to fit the section 19 on the fuselage. Where all motors in a group of motors are similarly provided with terminal union sections, it is apparent that motors may be interchanged on planes with very little difficulty.

The electrical connections for the motor are provided by wires 32 which are preferably led in through a flexible neck 33 on the section 19 and out through a similar neck 34 on the section 18. The parted ends of the wires are joined by snap connections in the form of round knobs 35 coacting with spring clips 36 on the ends of the wires. A block of insulation 37 is set in a recess 38 in the section 19 at the outer end of the bore 39 leading thru the section 19 through which the wires are passed. This block insulates the various wires from one another and from the union itself. Another block of insulation 40 is provided in the section 18 for a similar purpose. The blocks 37 and 40 are both rigid in the sections 18 and 19 and serve properly to locate the connections for the various wires. It is, of course, apparent that the electrical connections are thus made and broken when the sections of the terminal union are connected and disconnected by the nut 21. The dowel pin 30 in this instance serves a similar function as in the case of the feed lines to insure proper connection of the various wires.

It is further proposed to have rotary shaft connections passed through the terminal union, for driving the tachometer or for transmitting other necessary rotary movements, and also for the throttle control rods. As shown in Figs. 2 and 3, one part of the throttle control rod 41 is journalled in the lower section 19 of the terminal union and has a coupling 42 pinned or otherwise made rigid with the inner end thereof, while the other part of the rod 41 is journalled in the upper section 18 and has a squared end 43 to fit a socket 44 in the coupling 42. Thus, when the terminal union is assembled, the throttle control is made complete and the drives for the tachometer and other instruments passing through the terminal union are likewise completed. These connections are of course severed when the terminal union is disconnected and are as easily reconnected when the terminal union is again assembled. Dowel 30 in this case functions similarly as before to render certain the association of the proper parts in two sections of the terminal union.

We claim:

1. The combination of a frame, a motor removably mounted therein, leads for the gasoline and oil supply for said motor on said frame having connection with said motor, said leads being parted intermediate their ends whereby the ends connected to said motor are removed therewith from said frame, a split terminal block, one half of which stays with said frame and cooperates with the other half staying with said motor to join together the respective parted ends of said leads, and means to insure connecting said halves together in only one position.

2. The combination in an airplane, of a motor, a supporting frame section for said motor detachable as a unit from said airplane, controls, feed lines, electric wires, etc., extending from said airplane proper for connection with said motor, said controls, feed lines, electric wires, etc., being parted between said airplane proper and said frame section whereby the parted halves thereof stay respectively with said airplane proper and said frame section upon the removal of the latter and having ends adapted for detachable connection, a two-piece terminal union having one piece on the ends of the halves of the controls, feed lines, electric wires, etc., staying with said airplane proper and the other piece on the ends of the halves staying with the frame section, and a union nut for clamping said pieces together for a quickly detachable connection.

3. The combination of a main frame, a motor detachable therefrom, rotatable shafts extending between said frame and said motor from one to the other, said shafts being parted at a certain point to permit the separation of said motor from said frame, a two-piece terminal block having said parted shaft ends journalled therein, detachable coupling means for said shaft ends holding them to turn together when the pieces of said terminal block are assembled, and means for holding said pieces together.

4. The combination in an airplane having a motor to be replaced from time to time, connections such as for gasoline, oil, and ignition extending between said motor and the fuselage and cockpit of the airplane, a terminal block of separable pieces to which are led the parted ends of all of said connections, and a single nut for detachably fastening together the pieces of said terminal block.

5. A connecting union for a motor unit, comprising male and female housing members, a plurality of control lines, including fluid carrying tubes, electrical cables, and control rods, mounted in said housing members, said control lines having ends in each housing member which will mate and form connections, means to secure the housing members together, and guide means for insuring the proper connection of all the control lines on securing the housing members together.

In testimony whereof we affix our signatures.

ROBERT KAUCH.
CHARLES L. PAULUS.